Figure 1:
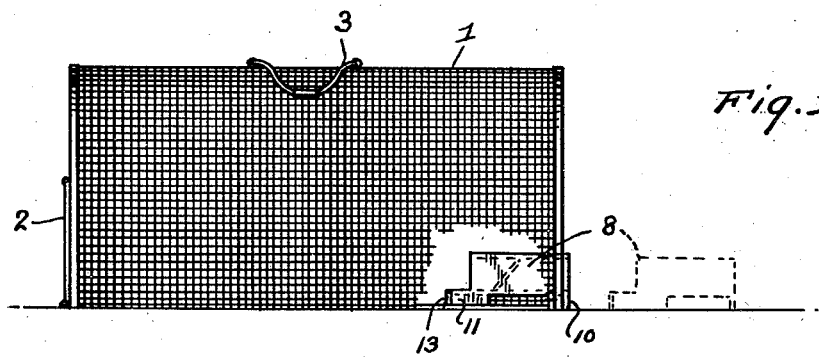

June 12, 1945.  E. B. RICE  2,377,967

RAT TRAP

Filed July 7, 1943

Inventor

Eutie B. Rice

By Clarence A. O'Brien
and Harvey B. Jacobson
Attorney.

UNITED STATES PATENT OFFICE 2,377,967

RATTRAP

Eulie Brent Rice, Washington, D. C.

Application July 7, 1943, Serial No. 493,763

1 Claim. (Cl. 43—66)

My invention relates to improvements in rat traps, the principal object in view being to provide a simply constructed, strong, and easily cleaned trap adapted to be baited so as to provide a scent trail luring a rat to follow the same into the trap until escape is impossible.

Other and subordinate objects are also comprehended by my invention, all of which, together with the precise nature of my improvements, will be readily understood when the succeeding description and claim are read with reference to the drawing accompanying and forming part of this specification.

Figure 2:
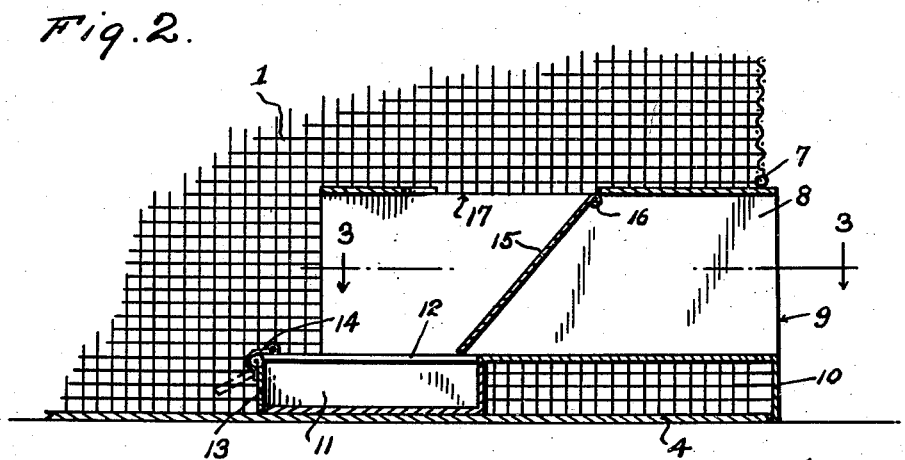
Figure 3:
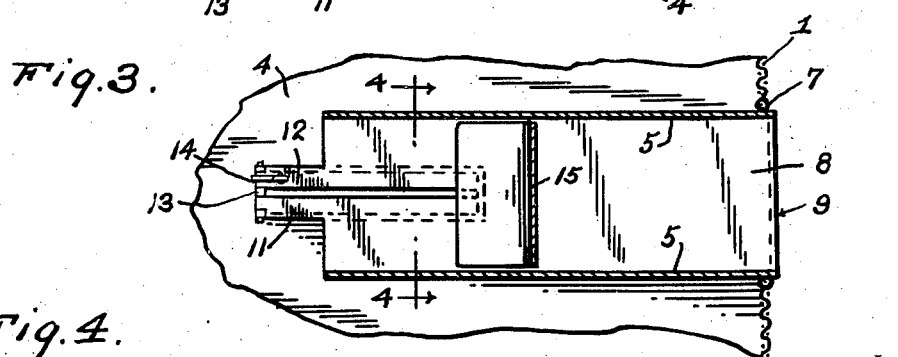
Figure 4:
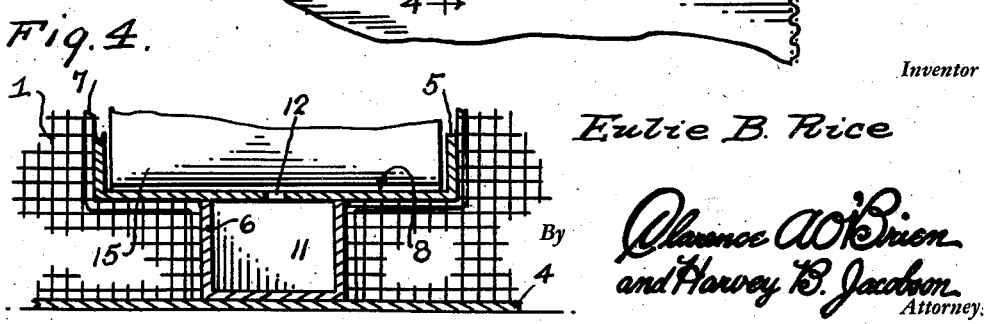

In said drawing:

Figure 1 is a view in side elevation of my improved rat trap, in its preferred embodiment, Figure 2 is a fragmentary view in longitudinal section drawn to an enlarged scale, Figure 3 is a view in horizontal section taken on the line 3—3 of Figure 2, and Figure 4 is a view in transverse section taken on the line 4—4 of Figure 3 and drawn to a further enlarged scale.

Referring to the drawing by numerals, my improved trap, as shown therein, comprises a suitable wire mesh cage 1 having a door 2 in one end thereof, a handle 3 at its top, and preferably a solid bottom 4. A relatively smaller T-shaped opening is provided in the other end of the cage 1 centrally of said end and adjacent the bottom 4, said opening 5 having a bottom central branch 6 at the level of the floor 4. A suitable reinforcing wire frame 7 is provided around the edges of the opening 5 and including a branch 6.

An elongated rectangular tunnel, or vestibule, 8, with open ends, is slidably fitted in the larger part of the opening 5 to extend therefrom into the cage 1 and provide an entrance end 9 in said larger part of the opening, the tunnel, as will be understood, being of substantially shorter length than that of the cage 1. A central tongue 10 depends from the entrance end 9 of the tunnel 8 and covers, or closes, the branch 6 of the opening 5. The tunnel 8 is formed at the bottom thereof with a relatively short, elongated, rectangular bait trough 11 depending below the bottom of the tunnel in the longitudinal center thereof and adapted to rest on the bottom 4 of the cage 1. The trough 11 extends forwardly of the inner end of the tunnel 8 for a short distance and rearwardly of said end for a suitable distance, and is provided in its otherwise closed top with a relatively narrow, central, longitudinally extending slot 12. The front end of the trough 11 is provided with a suitable hinged door 13 for introducing bait into the trough and which is normally held closed by a suitable catch 14. A trap door 15, pivoted, as at 16, in the top of the tunnel 8, intermediate the ends of the same, inclines downwardly toward the inner end of the tunnel 8 with its lower edge normally resting on the bottom of said tunnel slightly in advance of an adjacent end of the slot 12. The tunnel 8 above the trap door 15 is provided with an escape opening 17.

Referring now to the use and operation of the described invention, to bait the trap, the tunnel 8 is slid out of the cage 1, by way of the opening 5 and branch 6, suitable bait inserted in the trough 11 by way of the door 13 and deposited adjacent said door, which is to say, the innermost end of the trough 11. The tunnel 8 is then replaced in the cage 1 in a manner which will be clear, and the trap suitably located, as on the floor or the like. A rat, attracted by the bait, not shown, enters the tunnel 8, and while therein, finds that the scent of the bait arises through the slot 12 of the trough 11 just in advance of the trap door 15. The slot 12 provides a scent trail along which the scent grows stronger toward the end of the trough 11 furthest from the trap door 15 and whereby the rat is lured, by following the scent, to move past the trap door 15 until he is trapped by the same, it being understood, of course, that the trap door is raised by the progress of the rat thereunder and falls of its own weight behind the rat when he has passed completely from under the same. The opening 17 in the top of the tunnel 8 serves the useful purpose of preventing a trapped rat from attempting to crowd in between the top of the tunnel and the trap door 15, after he has passed the latter, and thereby breaking said door down. As will be understood, rats trapped in the cage 1 may be let out of the cage, or removed, by way of the door 2 for disposal, as desired.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A trap of the class described comprising a cage having an end wall provided with an opening therein, an elongated tunnel member extended into said cage through said opening and having an inner end opening into said cage, a trap door in said tunnel depending from the top thereof intermediate the ends of the tunnel and opening toward said inner end of the tunnel, and a bait trough extending along the bottom of the tunnel from substantially the bottom of said door beyond the inner end of the tunnel, said tunnel having a bottom wall forming the top of the trough, and a longitudinal scent slot in said wall extending from end to end of the trough.

EULIE B. RICE.